United States Patent [19]

Ralston et al.

[11] Patent Number: 4,552,665

[45] Date of Patent: Nov. 12, 1985

[54] STABILIZATION OF SOLUBLE MANGANESE AND ITS REACTION PRODUCTS

[75] Inventors: Paul H. Ralston, Bethel Park; Sandra L. Whitney, McDonald, both of Pa.

[73] Assignee: Calgon Corporation, Pittsburgh, Pa.

[21] Appl. No.: 607,027

[22] Filed: May 4, 1984

[51] Int. Cl.$^4$ .............................................. C02F 5/10
[52] U.S. Cl. .................................... 210/697; 210/699; 210/700; 210/701; 252/180; 252/181
[58] Field of Search ............................. 210/697–701; 252/180, 181

[56] References Cited

U.S. PATENT DOCUMENTS 3,790,610  2/1974  Lum et al. ............................ 210/698
3,852,213  12/1974  Cooney ................................ 210/698
4,209,398  6/1980  Ii et al. ................................... 422/15
4,283,300  8/1981  Kurtz .................................... 210/701
4,452,713  6/1984  Small .................................... 210/697

Primary Examiner—Peter Hruskoci
Attorney, Agent, or Firm—Michael C. Sudol; R. Brent Olson; William C. Mitchell

[57] ABSTRACT

The instant invention is directed to a process for inhibiting the precipitation of dissolved manganese ion and its reaction products in aqueous solutions, comprising adding to the aqueous solution 0.1 to 20 ppm of a copolymer of an unsaturated carboxylic acid or salt selected from the group consisting of acrylic acid and methacrylic acid and an unsaturated sulphonic acid or salt selected from the group consisting of 2-acrylamido-2-methylpropylsulphonic acid and 2-methacrylamido-2-methylpropylsulphonic acid.

4 Claims, No Drawings

STABILIZATION OF SOLUBLE MANGANESE AND ITS REACTION PRODUCTS

BACKGROUND OF THE INVENTION

The instant invention relates to the use of carboxylic acid/sulphonic acid copolymers to stabilize soluble manganese ion and its reaction products in desirable forms and reduced particle sizes. Manganous ions are often found in well waters while cooling waters contain primarily the manganic species. Anionic species of carbonate, bicarbonate, sulfite, fluoride, chloride, sulfate, etc., and dissolved oxygen may be present in both waters. Oxygen reaction products of iron, manganese, and aluminum can collect on metal surfaces and accelerate corrosion and reduce heat transfer. The copolymers of the instant invention can keep these reaction products in colloidal/fine, dispersed form rather than the normal flocculant, adherent species. The manganese, thus, remains soluble so that it will not form particles which will precipitate out of solution and form scale. The copolymer of the instant invention, thus, acts as a particle size reducer and inhibitor of undesirable reaction species.

DESCRIPTION OF THE INVENTION

The instant invention is directed to a process for inhibiting the precipitation of dissolved manganese ion and its reaction products in aqueous solutions, comprising adding to the aqueous solution 0.1 to 20 ppm of a copolymer of an unsaturated carboxylic acid or salt selected from the group consisting of acrylic acid and methacrylic acid and an unsaturated sulphonic acid or salt selected from the group consisting of 2-acrylamido-2-methylpropylsulphonic acid and 2-methacrylamido-2-methylpropylsulphonic acid.

The phrase "inhibiting the precipitation" is meant to include threshold inhibition, dispersion, solubilization, particle size reduction, or reaction product change.

The phrase "aqueous system" is meant to include any system containing water; including, but not limited to, cooling water, boiler water, desalination, gas scrubbers, blast furnaces, sewage sludge thermal conditioning equipment, reverse osmosis, sugar evaporators, paper processing, mining circuits and the like.

The unsaturated carboxylic acids or their salts which may be used to prepare the copolymer include acrylic acid and methacrylic acid. The unsaturated sulfonic acid or its salt which may be used to prepare the copolymer include 2-acrylamido-2-methylpropylsulfonic acid and 2-methacrylamido-2-methlylpropyl-sulfonic acid. The weight ratio of carboxylic acid to sulfonic acid should be 1:20 to 20:1, preferably 1:10 to 10:1, most preferably 4:1 to 1:4. The admixture is used at a dosage of 0.1 to 20 ppm.

It is preferred that the copolymer have a weight average molecular weight of less than about 50,000, preferably less than 25,000, most preferably less than 10,000, as determined by low angle laser light scattering.

The copolymer was also found to be effective in combination with polycarboxylates, phosphonates and phosphates.

Any water-soluble polycarboxylate may be used. Examples include polymers derived from homo- and/or copolymers (including terpolymers, tetra-, etc.) of acrylic acid, methacrylic acid, vinyl acetic acid, allyl acetic acid, fumaric acid, phosphinocarboxylic acid, maleic acid or anhydride, itaconic acid, α-halo acrylic acid and β-carboxyethyl acrylate.

Any water-soluble phosphonate may be used. Examples include 2-phosphono-1,2,4-tricarboxybutane, amino tri(methylene phosphonic acid), hydroxyethylidene diphosphonic acid, phosphonosuccinic acid, benzene phosphonic acid, 2-aminoethyl phosphonic acid, polyamino phosphonates and the like. Additional phosphonates are identified in U.S. Pat. No. 3,837,803, which is hereby incorporated by reference. The preferred phosphonates are amino tri(methylene phosphonic acid) and hydroxyethylidene diphosphonic acid.

Any water-soluble phosphate may be used. Examples include orthophosphate; condensed phosphates, such as sodium hexametaphosphate; phosphate esters; organophosphate esters, such as the lower alkyl mono-, di- and trialkyl phosphates. The alkyl group is selected from $C_1$ to $C_4$ and may be branched or unbranched. The alkyl group may be substituted with hydroxy, amino, halide, sulfate or sulfonate, alone or in combination; and molecularly dehydrated phosphates. The preferred phosphates are the polyphosphates (1 to 2 $M_2O:1P_2O_5$).

The weight ratio of component copolymer to additional additives is preferably 1:50 to 50:1, more preferably 1:10 to 10:1.

The term "copolymer" is meant to include copolymers, terpolymers, etc. copolymers are preferred.

EXAMPLES

Manganese stabilization was tested with a 60/40 copolymer of acrylic acid/2-acrylamido-2-methylpropyl sulfonic acid, by itself and in combination with other additives. 2 ppm $Mn^{+2}$ was added to a liter of tap water. pH8, 50° C. 2.5 ppm $Cl_2$ was added to speed up oxidation of the manganese. The amount of manganese which had agglomerated to a particle size of 25μ or greater was measured by filtering through 25μ filter paper. The percent manganese having a particle size less than 25μ was then determined. When no inhibitor was present, the minimal concentration of manganese in the filtrate represented 0% inhibition. At 100% manganese inhibition, the theoretical manganese concentration was found in the filtrate. Intermediate percent manganese stabilization is related to intermediate concentrations of manganese in the filtrate.

TABLE

Mn Stabilization
2 ppm $Mn^{+2}$, 2.5 ppm $Cl_2$, pH 8, agitated open breakers, 50° C. bath, 25μ Filtered prior to analysis.

| Example | Additive | ppm | 2 | 4 | 6 | 24 | 48 | 72 (hrs) |
|---|---|---|---|---|---|---|---|---|
| | | | | | | | % Stabilization | |
| 1 | none | — | 0 | 0 | 0 | 0 | 0 | 0 |
| 2 | AA/AMPS[1] | 2.0 | 96 | 100 | 99 | 100 | 100 | 100 |
| 3 | PAA[2] | 2.0 | 94 | 98 | 99 | 98 | 87 | 58 |
| 4 | HEDP[3] | 2.0 | — | — | 81 | 67 | 70 | — |
| 5 | sodium hexa- | 2.0 | 85 | 71 | 53 | 39 | 29 | — |

TABLE-continued

Mn Stabilization
2 ppm $Mn^{+2}$, 2.5 ppm $Cl_2$, pH 8, agitated open breakers, 50° C. bath, 25μ Filtered prior to analysis.

| Example | Additive | ppm | 2 | 4 | 6 | 24 | 48 | 72 (hrs) |
|---|---|---|---|---|---|---|---|---|
| | metaphosphate | | | | | | | |
| 6 | AMP[4] | 2.0 | — | — | 79 | 73 | 61 | 51 |
| 7 | AA/AMPS + PAA | 1.0 1.0 | | | 100 | 100 | 100 | |
| 8 | AA/AMPS + HEDP | 1.0 1.0 | | | 100 | 100 | 100 | |
| 9 | AA/AMPS + sodium hexa-metaphosphate | 1.0 1.0 | 100 | 100 | 100 | | | |
| 10 | AA/AMPS + AMP | 1.0 1.0 | 100 | 100 | 100 | | | |

[1]AA/AMPS = 60/40 copolymer of acrylic acid and 2-acrylamido-2-methylpropyl sulfonic acid having a weight average molecular weight of about 8200, as determined by low angle laser light scattering.
[2]PAA = polyacrylic acid, MWt 4700 as determined by light scattering
[3]HEDP = Hydroxyethylidene diphosphonic acid.
[4]AMP = amino tri (methylene phosphonic acid).

What is claimed is:

1. A process for inhibiting the precipitation of dissolved manganese ion and its reaction products in aqueous solutions, comprising adding to an aqueous solution containing manganese ions 0.1 to 20 ppm of a copolymer of an unsaturated carboxylic compound selected from the group consisting of acrylic acid, methacrylic acid, their salts and mixtures thereof, and an unsaturated sulfonic compound selected from the group consisting of 2-acrylamido-2-methylpropylsulphonic acid, 2-methacrylamido-2-methylpropylsulphonic acid, their salts and mixtures thereof, wherein said copolymer has a weight average molecular weight of less than about 50,000, as determined by low angle laser light scattering and said carboxylic compound to sulfonic compound has a weight ratio of 1:20 to 20:1, to inhibit the precipitation of said manganese ions and disperse said reaction products.

2. The process of claim 1, wherein said copolymer is added in combination with a compound selected from the group consisting of water-soluble polycarboxylates, phosphonate and phosphates and the weight of said copolymer to said polycarboxylate, phosphonate, or phosphate is 1:50 to 50:1.

3. The process of claim 2, wherein said polycarboxylate is polyacrylic acid.

4. The process of claim 2, wherein said phosphonate is selected from the group consisting of hydroxyethylidene diphosphonic acids and amino methylene phosphonic acids.

* * * * *